(12) United States Patent
Chen et al.

(10) Patent No.: US 6,476,509 B1
(45) Date of Patent: Nov. 5, 2002

(54) MOBILE AC POWER SYSTEM

(75) Inventors: John Jianing Chen; Michael D. Ballard, both of Oklahoma City; Jinghui Sun, Norman, all of OK (US)

(73) Assignee: Unit Parts Company, Oklahoma City, OK (US)

( * ) Notice: Subject to any disclaimer, the term of this patent is extended or adjusted under 35 U.S.C. 154(b) by 0 days.

(21) Appl. No.: 09/838,648

(22) Filed: Apr. 19, 2001

(51) Int. Cl.[7] .................................................. H02P 9/00
(52) U.S. Cl. ........................................ 290/1 R; 322/8
(58) Field of Search ................................ 290/1 R, 4 R, 290/38 R; 322/1, 7, 8

(56) References Cited

U.S. PATENT DOCUMENTS

| | | | | |
|---|---|---|---|---|
| 4,785,227 A | * | 11/1988 | Griffin .......................... | 290/4 R |
| 5,086,266 A | | 2/1992 | Shiga et al. ................... | 322/28 |
| 5,373,196 A | * | 12/1994 | Faley ............................ | 307/46 |
| 5,606,244 A | * | 2/1997 | Migdal ......................... | 307/16 |
| 6,107,691 A | * | 8/2000 | Gore et al. .................... | 290/1 R |

* cited by examiner

Primary Examiner—Nicholas Ponomarenko
(74) Attorney, Agent, or Firm—Dunlap, Codding & Rogers, P.C.

(57) ABSTRACT

A portable generator assembly comprising an alternator installable in a vehicle, and a power converter. The alternator includes an AC output port electrically connected to the stator windings of the alternator for receiving the AC output signal, and providing access to the AC output signal such that the AC output signal can provide AC power at a location outside of the alternator's housing. The power converter is provided with a transformer, a frequency changer, and an electrical outlet. The transformer receives the AC output signal from the AC output port and increases the voltage of the AC output signal to at least about 120 V. The frequency changer receives the AC output signal having the increased voltage, and converts the frequency of the AC output signal to a frequency between about 45 to about 65 Hz. The electrical outlet receives the AC output signal having the increased voltage and converted frequency. An electrical implement, such as a hand drill, can be plugged into the electrical outlet so as to provide power for operating the electrical implement.

11 Claims, 6 Drawing Sheets

MOBILE AC POWER SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to portable generators and methods for producing portable generators, and more particularly, but not by way of limitation, to an improved portable generator for providing a 120 volt (V) alternating current (AC) output and a direct current output (14V, 28V or 42 V) and methods of producing, installing and using such an improved alternator.

2. Brief Description of the Prior Art

There are many instances where it is helpful to have access to a portable generator having an Alternating Current (AC) output. For example, during emergencies when commercial AC power is knocked out by a natural disaster, such as a tornado or an earthquake, a need exists for a source of AC electricity to temporarily power various home appliances, such as a television, a refrigerator, a freezer, a lighting system, and a heating/cooling system to notify the homeowner of various weather conditions, prevent spoilage of food and/or inconvenience to the homeowner.

Moreover, people are frequently in locations where it is inconvenient or impossible to. run commercial AC electricity. For example, farmers or homeowners frequently use electrically powered tools to work on fences, trim bushes and trees and the like where it is inconvenient to run an extension cord to the site where the farmer or homeowner is working. During recreational activities, such as picnics, fishing, camping, and the like, people are frequently without a source of commercial AC electricity.

Many sources of electricity already exist. For example, alternators for vehicles are well known in the art. The prior art alternators, such as the CS-130 alternator manufactured by General Motors, generate three-phase AC electricity and convert the three-phase AC electricity to Direct Current (DC) electricity to meet the vehicle's electrical needs. DC Outputs, such as cigarette lighter sockets, battery terminals and the like are provided with the vehicle so that the driver has a source of DC electricity.

Inverters, which connect to the DC outputs on the vehicle, exist. The prior art inverters convert the DC output from the vehicle into AC electricity. While it is true that the prior art inverters can provide a portable source of AC electricity, various drawbacks to the prior art inverters exist. For example, the prior art inverters are relatively inefficient because the prior art inverters connect to the DC output of the vehicle. This causes the three-phase AC electricity produced by the alternator to be converted from AC electricity to DC electricity by the alternator rectifier, and then converted from DC electricity to AC electricity by the inverter. Thus, the inverters do not provide enough AC electricity to adequately power many electrical appliances because of the losses and inefficiencies caused by the AC to DC and DC to AC conversions. Moreover, the prior art inverters are typically expensive and capable of operating while the vehicle is not running thereby discharging the vehicle's battery. Discharging the vehicle's battery makes it difficult for the battery to start the engine; reduces the life of the battery and causes inconvenience to the consumer. Moreover, most inverters in the market cannot supply AC power clear enough for precise equipment.

AC generators constructed for installation in commercial vehicles, such as large trucks and vans also exist. For example, one such AC generator is disclosed in U.S. Pat. No. 5,734,217. These AC generators provide an Alternating Current output, but no Direct Current output. The AC generator does not replace the alternator in the commercial vehicle. Rather, the AC generator is installed in addition to the alternator in the commercial vehicle. Thus, the vehicle has the alternator for producing DC electricity for the vehicle, and the AC generator for producing the AC electricity. This is expensive and not practical for vehicles typically owned by individual consumers, such as passenger vehicles. In fact, most passenger vehicles do not have enough space under the vehicle's hood for the additional AC, generator.

Portable AC generators also exist. These portable AC generators are typically powered by a relatively small gasoline engine having a size of about 4 to about 5 horsepower. To Applicant's knowledge, these AC generators do not provide a DC power output. These gasoline AC generators include both the generator and the, engine. These gasoline AC generators are inconvenient to move and to store because of their large physical size.

In light of the foregoing, there is a need for a portable generator providing both an AC output and a DC output, which is convenient for the consumer to use and cost-effective. It is to such an improved portable generator that the present invention is directed.

BRIEF SUMMARY OF THE INVENTION

Broadly, the present invention relates to a portable generator assembly having a DC output port and an AC output port. The portable generator assembly is provided with an alternator, and a power converter.

The alternator is installable in a vehicle. The alternator is provided with a housing, a rotor coil, a plurality of stator windings, a voltage regulator, a rectifier, and an AC output port. The housing defines an alternator interior space. The rotor coil is disposed in the alternator interior space and is rotatably supported by the housing. The rotor coil generates a magnetic field. The plurality of stator windings is supported by the housing and positioned in the magnetic field for generating an AC output signal, typically having a voltage between about 9.5 VAC and 12 VAC for a 14V DC output, or between about 25 V AC to about 36 VAC for a 42V DC output. The voltage regulator is electrically connected to the rotor coil for controlling the intensity of the magnetic field.

The rectifier has an input and an output. The input of the rectifier is electrically connected to the stator windings such that the input of the rectifier receives the AC output signal generated by the stator windings. The rectifier converts the AC output signal to a DC output signal.

The AC output port is electrically connected to the stator windings for receiving the AC output signal, and thereby providing access to the AC output signal such that the AC output signal can provide AC power at a location outside of the housing.

The power converter is typically positioned outside of the housing of the alternator. The power converter is provided with a transformer, a frequency changer, and one or more than one electrical outlet. By way of example, the electrical outlet(s) is preferably a Ground Fault Circuit Interrupter (GFCI) electrical outlet. The transformer receives the AC output signal from the AC output port and increases the voltage of the AC output signal to at least about 120 V. The frequency changer receives the AC output signal having the increased voltage, and converts the variable frequency of the AC output signal (typically between about 160 Hz to about 800 Hz) to a substantially constant preset frequency of either 60 Hz or 50 Hz. The electrical outlet receives the AC output signal having the increased voltage and converted frequency such that upon plugging an electrical implement into the electrical outlet, AC electrical power is provided to the electrical implement.

Thus it can be seen that there are many advantages of the present invention. The portable generator assembly can be used for providing emergency AC electricity for temporarily powering one or more various home appliances, such as a television, a refrigerator, a freezer, a lighting system, and a heating/cooling system during emergencies. AC electricity can also be supplied at locations where commercial AC electrical power is not available by driving the vehicle having the alternator to the remote location.

Moreover, passenger vehicles having predetermined alternator spaces for receiving the alternator are widely available. The alternator of the present invention can be installed in these passenger vehicles without any costly modifications to the passenger vehicle. Thus, the present invention provides an economical alternative to the portable AC generators having the small gasoline engine.

In one preferred embodiment, the power converter is provided with a portable housing containing the transformer, the frequency changer and the electrical outlet. Assuming that the vehicle is an automobile, the power converter having the portable housing can be stored in the vehicle's trunk when the power converter is not in use. In another preferred embodiment, the power converter is permanently installed in the vehicle so as to provide the vehicle with a permanent AC electrical outlet.

Other advantages and features of the present invention will become apparent to those skilled in the art when the following detailed description is read in conjunction with the attached drawings and appended claims.

DETAILED DESCRIPTION OF THE INVENTION

Figure 1:
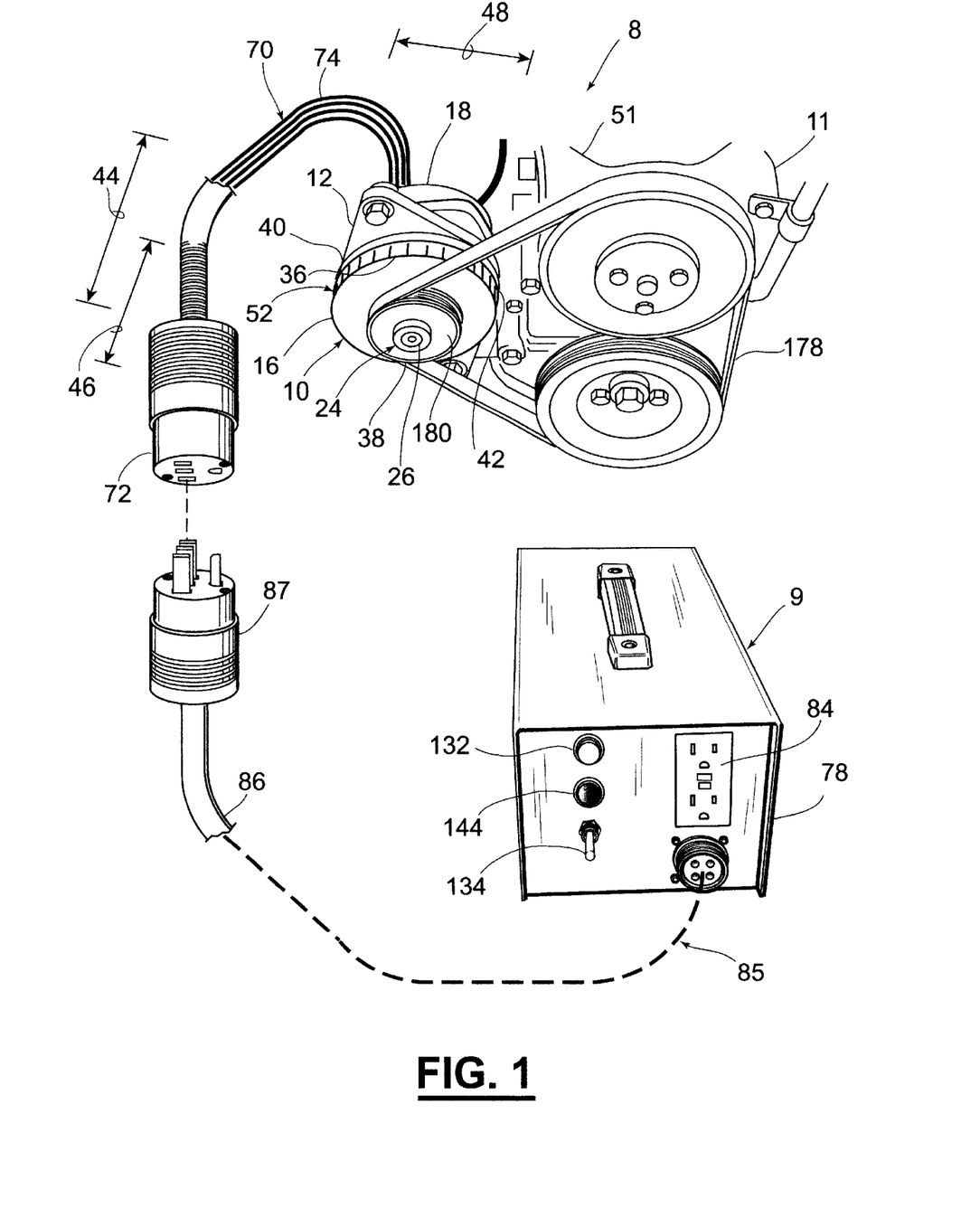
FIG. 1 is a perspective view of a portable generator assembly constructed in accordance with the present invention.

Referring now to the drawings and in particular to FIG. 1, a portable generator assembly 8, constructed in accordance with the present invention, is shown for providing a DC output signal typically having a voltage in a range from about 12.5 to about 14 V for a 12 V system or from about 36 V to about 48 V for a 42 V system. The portable generator assembly 8 also provides an AC output signal having a voltage of at least about 105 V and a preset, substantially constant. frequency of either 60 Hz or 50 Hz. In one preferred embodiment, the AC output signal has a voltage of about 120 Volts and a frequency of about 60 Hz so as to provide power to a wide variety of electrical implements in the United States.

The portable generator assembly 8 is provided with a power converter 9, constructed in accordance with the present invention, and an alternator 10, constructed in accordance with the present invention. The alternator 10 is installed in a vehicle 11. The vehicle 11 can be any vehicle utilizing an alternator and having a propulsion system, such as an automobile, a motorcycle, an all-terrain vehicle, a three-wheeler, a four-wheeler, a snowmobile, a boat, a train, an airplane, a tractor, a combine (or other type of farm implement) or the like. In one preferred embodiment, the vehicle 11 is an automobile.

The DC output signal is provided with a selected voltage, such as 7 V, 14 V, 28 V or 42 V, so as to power the vehicle's electrical accessories and/or recharge the vehicle's battery. For example, the accessories can be headlights, radios, dash lights, coils, or air conditioners provided as standard equipment on the vehicle 11, or otherwise installed in the vehicle 11.

Figure 2:
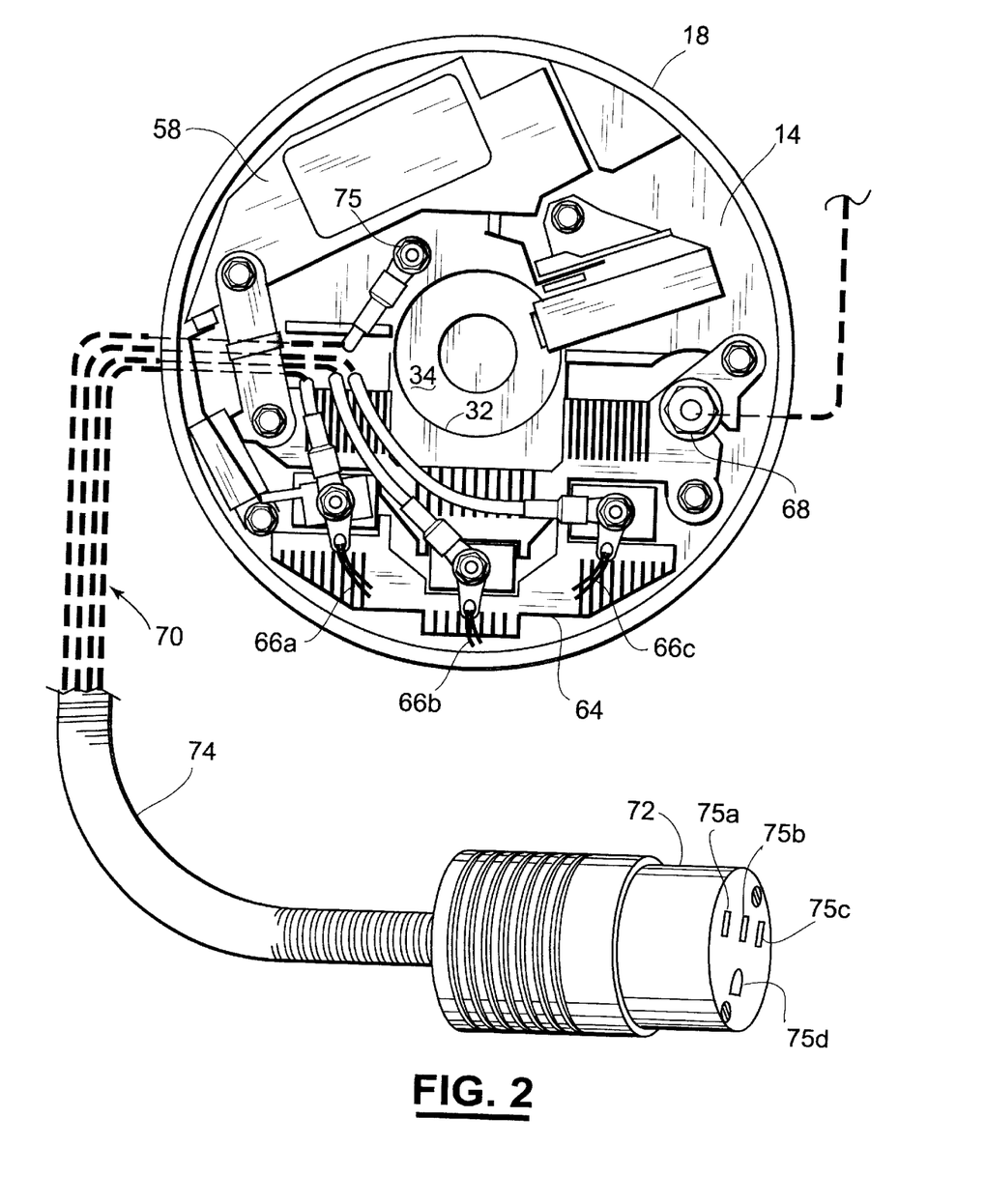
FIG. 2 is a cutaway elevational view of an alternator of the portable generator assembly to show some of the internal components of the alternator.

The construction of alternators is well known in the art. Only certain features of the conventional alternator will be described herein to enhance the understanding of the inventive concept set forth herein. The alternator 10 is provided with a housing 12 (FIG. 1) defining an alternator interior space 14 (FIG. 2). The housing 12 is provided with a drive end housing 16 and a slip ring end housing 18. The drive end housing 16 is provided with a plurality of air vents (not shown) formed there through and the slip ring end housing 18 is provided with a plurality of air vents (not shown) formed there through so that air can flow into the alternator interior space 14 through the air vents in the slip ring end housing 18 and out of the alternator interior space 14 through the air vents in the drive end housing 16. The particular path of the air flow is not critical to the present invention. Thus, it should be understood that the alternator 10 can be provided with any suitable air flow path for cooling the alternator 10.

The alternator interior space 14 of the housing 12 is adapted to receive a rotor 24 having a drive shaft 26. The drive end housing 16 is provided with a bearing well (not shown) adapted to receive a drive end bearing (not shown) for rotatably supporting one end of the drive shaft 26 of the rotor 24. The slip ring end housing 18 is provided with a bearing well 32 (FIG. 2) adapted to receive a slip ring end bearing 34 (FIG. 2) for rotatably supporting the other end of the drive shaft 26 of the rotor 24.

The housing 12 of the alternator 10 has a first side 36, a second side 38, a top end 40, a bottom end 42, a predetermined length 44, a predetermined width 46, and a predetermined height 48. The predetermined length 44 of the housing 12 extends generally between an outermost portion of the drive end housing 16 and an outermost portion of the bearing well 32 of the slip ring end housing 18. The predetermined width 46 of the housing 12 extends generally between the first side 36 and the second side 38 thereof. The predetermined height 48 of the housing 12 extends generally between the top end 40 and the bottom end 42 thereof.

In an installed position, the alternator 10 is disposed in a predetermined alternator space 49 within the vehicle 11. The alternator space has a predetermined length, a predetermined width and a predetermined height which correspond to the length 44, width 46, and height 48, respectively, of the alternator 10.

The rotor 24 (FIG. 1).of the alternator 10 is provided with a rotor coil (not shown) in which a magnetic field is generated. The vehicle 11 includes an engine 51. The rotor coil (not shown) is rotated by the engine 51, in a manner well-known in the art.

The alternator 10 is provided with a stator assembly 52 (FIG. 1) which surrounds the rotor coil and is positioned in the magnetic field generated by the rotor coil. The stator assembly 52 has a plurality of stator windings (not shown) wound about a stator lamination, typically in a three-phase configuration.

The rotor coil is rotated by the engine 51 via the drive shaft 26 of the rotor 24 so that a current is induced in the stator windings such that the alternator 10 generates Alternating Current (AC) electricity. The electricity induced in the stator windings is typically three-phase electricity; although in some instances single phase electricity may be produced.

A voltage regulator 58 (FIG. 2) is provided in the alternator interior space 14 of the housing 12 and is electrically connected to the rotor coil via slip rings (not shown) provided on the drive shaft 26 of the rotor 24 for controlling the intensity of the magnetic field generated by the rotor coil 50 such that the voltage output of the alternator 10 is maintained within predefined limits.

The AC output signal induced in the stator windings is supplied to a rectifier 64 via three output leads 66 which are either connected to or formed integrally with the stator windings and which are electrically connected to the rectifier 64. The output leads are designated by the reference numerals 66a, 66b, and 66c. When the stator windings are provided in a three-phase configuration, three output leads 66 are provided. However, it should be understood that two output leads 66 may be provided if the stator windings 54 are in a single phase configuration. The rectifier 64 rectifies the AC output signal induced in the stator windings 54 so as to provide a DC output signal. Although the magnitude of the DC output signal can vary widely depending on the specifications of the alternator 10, the DC output signal typically has a voltage between about 12.5 Volts to about 15 volts for a 12 V charging system or between 36 V and 48 V for a 42 V charging system.

The DC output signal is transmitted to a DC output port 68 (FIG. 2) provided on the alternator 10. As will be understood by those skilled in the art, the particular implementation of the DC output port 68 will vary among different makes and models of alternators 10. For example, the DC output port can be a terminal commonly referred to in the art as a "B+post", or any other suitable DC output port.

In accordance with the present invention, the alternator 10 is also provided with an AC output port 70. The AC output port 70 is electrically connected to the stator windings so as to receive the AC output signal induced in the stator windings. In the preferred embodiment shown in FIGS. 1 and 2, the AC output port is provided with a plug 72, and a plurality of leads 74 having one end connected to the plug 72. The other ends of the leads 74 are electrically connected to the stator windings. More specifically, in one preferred embodiment, the other ends of the leads 74 are connected to the output leads 66 of the stator windings 54, at the junction of the output leads 66 and the input of the rectifier 64.

The plug 72 is preferably a female plug having four terminals 75a, 75b, 75c and 75d. Three of the terminals 75a, 75b and 75c receive the AC output signal induced in the stator windings 54 when the AC output signal is a three-phase signal. The fourth terminal 75d is connected to a ground 76, e.g. the housing 12 of the alternator 10, or the chassis of the vehicle 11. However, it should be understood that the fourth terminal can be omitted if the power converter 9 is electrically connected to the same ground as the alternator 10. Moreover, it should be understood that the plug 72 can have less than four terminals if the AC output signal is a single-phase signal. The plug 72 can be bolted, clamped, glued or otherwise secured to the vehicle 11 to maintain the plug 72 in a fixed location. Alternatively, the leads 74 and the plug 72 can be configured such that the plug 72 is not secured in a fixed location and is thereby movable.

The power converter 9 is connectable to the AC output port 70 on the alternator 10 so as to receive the AC output signal from the alternator 10 via the plug 72. Alternatively, the plug 72 can be omitted and the power converter 9 can be hardwired to the leads 74 if the power converter 9 is permanently installed in the vehicle. As discussed above, for a 12 V system, the AC output signal has a voltage in a range from about 9 VAC to about 12.5 VAC. In general, the power converter 9 is provided with a housing 78 containing a transformer 80 (FIG. 4), a frequency changer 82 (FIG. 4), and one or more than one electrical outlet 84. The electrical outlet 84 can be any suitable type of electrical outlet, such as a three prong grounded 120 V outlet. In one preferred embodiment, the electrical outlet 84 is a Ground Fault Circuit Interrupter (GFCI) electrical outlet.

In some instances, the housing 78 can be omitted. For example, if the power converter 9 was permanently installed in the vehicle 11, the transformer 80 could be positioned in the engine compartment, and the electrical outlet 84 could be positioned in the cab of the vehicle 11. The frequency changer 82 could be positioned in any convenient location. In this example, there would be no housing containing the transformer 80, the frequency changer 82 and the electrical outlet 84.

The transformer 80 receives the AC output signal from the AC output port 70 via an AC input port 85. The AC input port 85 can be provided with a plurality of leads 86 and a plug 87. The transformer 80 increases the voltage of the AC output signal to at least about 120 V. In one preferred embodiment, the transformer 80 increases the voltage of the AC output signal to about 140 Volts.

The AC output signal having the increased voltage has a frequency typically varying between about 160 Hz to about 800 Hz depending on the speed of rotation of the rotor 24. The frequency changer 82 receives the AC output signal having the increased voltage from the transformer 80. The frequency changer 82 converts the varying frequency of the AC output signal to a stabilized or substantially constant frequency between about 45 Hz to about 65 Hz, and desirably to about 60 Hz, i.e. the standard frequency of AC power in the United States. As another example, the frequency changer 82 can be designed to provide AC output signals having a frequency of 50 Hz so as to conform with European standards. If the AC output signal received by the frequency changer is in a three-phase form, the frequency changer 82 also converts the AC output signal to a single phase signal.

Figure 4:
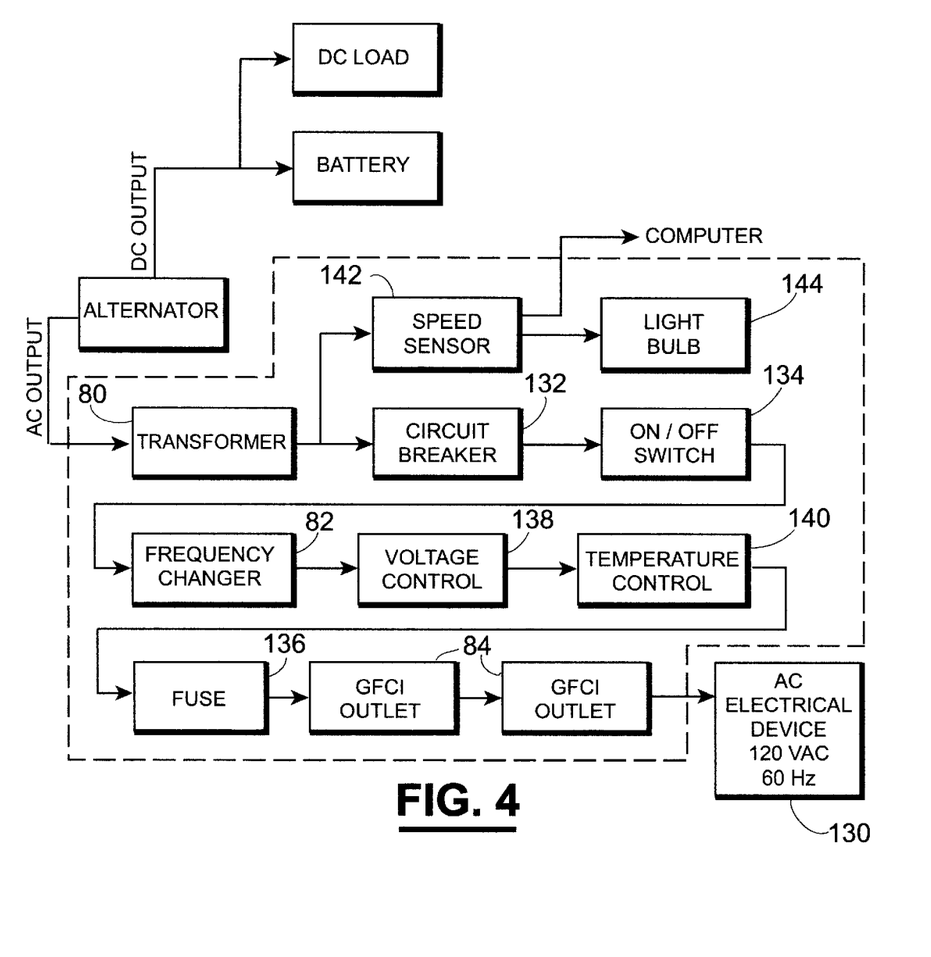
FIG. 4 is a schematic, diagrammatic view of the power converter depicted in FIG. 3.
Figure 4A:
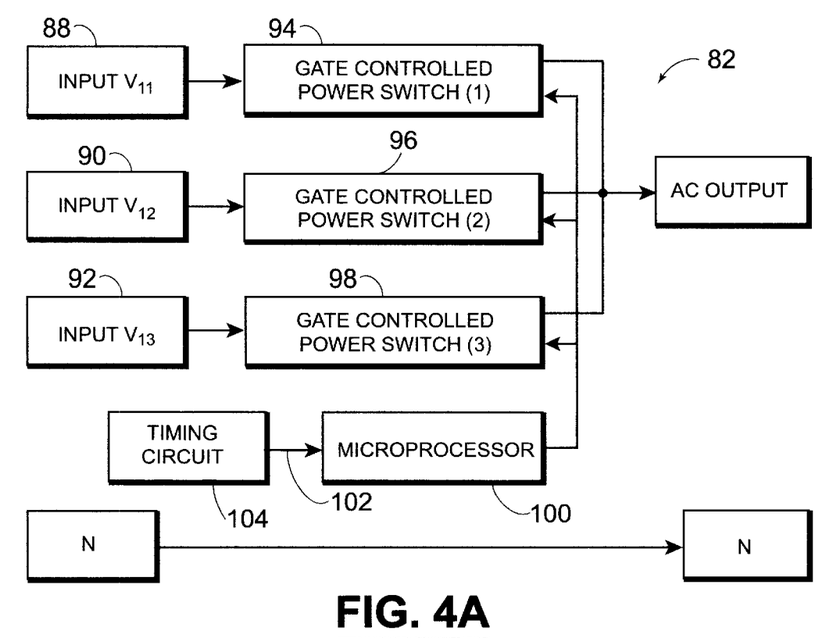
FIG. 4A is a schematic, diagrammatic view of a first version of a frequency changer, constructed in accordance with the present invention.
Figure 4B:
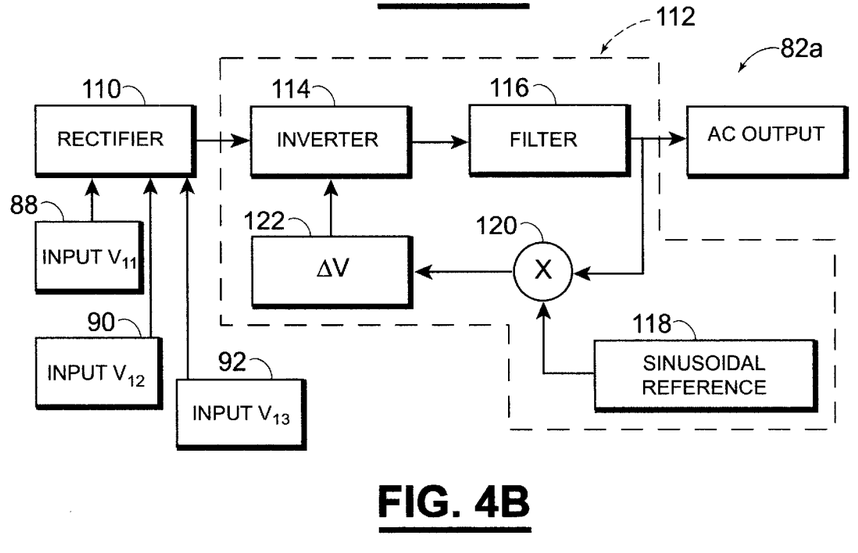
FIG. 4B is a schematic, diagrammatic view of a second version of a frequency changer, constructed in accordance with the present invention.

Referring now to FIG. 4A, shown therein is a more detailed schematic diagram of the frequency changer 82. The frequency changer 82 can be any circuit capable of directly converting three-phase AC power of a variable frequency to a single phase AC power of a chosen frequency. Two examples of suitable frequency changers are shown in FIGS. 4A and 4B. The three phase AC power is shown in FIGS. 4A and 4B as an input $V_{11}$ 88, an input $V_{12}$ 90 and input $V_{13}$ 92 with the input $V_{11}$ 88, the input $V_{12}$ 90 and the input $V_{13}$ 92 each representing one-phase of the three phase AC power.

In the preferred embodiment shown in FIG. 4A, the frequency changer 82 is a wave synthesizer. The frequency changer 82 fabricates the output-voltage wave of a desired amplitude and frequency by sequentially applying appropriate segments of the input wave from the input $V_{11}$ 88, the input $V_{12}$ 90 and the input $V_{13}$ 92 to the output wave. In the preferred embodiment, this is accomplished by an array of controllable power switches 94, 96 and 98 arranged to make bilateral connections, for controlled time intervals, between the input and the output. Each of the controllable power switches 94, 96 and 98 can be any suitable power switch with intrinsic turn-on and turn-off ability, such as a gate controlled MOSFET, a transistor, a thryristor, or a triac, for example.

The controllable power switches 94, 96 and 98 are controlled by a microprocessor 100. The microprocessor 100 receives a timing signal 102 from a timing circuit 104, such as a crystal, to determine a repetition rate and/or a duration of switch closures. Once the repetition rate and/or the duration has been determined, the microprocessor 100 outputs signals to the controllable power switches 94, 96 and 98 so as to selectively turn-on and turn-off the controllable power switches 94, 96 and 98 to produce the single phase AC power with a substantially constant selected frequency. The microprocessor 100 can be any device capable of executing predetermined logic for carrying out the purposes set forth herein For example, the microprocessor 100 can be a logic control unit, a microprocessor or a digital signal processor.

Shown in FIG. 4B and designated by a reference numeral 82a is another embodiment of a frequency changer constructed in accordance with the present invention for use in the power converter 9. The frequency changer 82a can be characterized as a rectifier 110 in combination with a DC-AC inverter 112. More specifically, the three phase output from the transformer 80 (as represented by the input $V_{11}$ 88, the input $V_{12}$ 90 and the input $V_{13}$ 92) is converted to a DC voltage output by the rectifier 110. The DC-AC inverter 112 includes an inverter 114. The inverter 114 receives the DC voltage and converts the DC output to the AC output signal having a substantially constant frequency. The output of the inverter 114 is passed through a filter 116 so as to smooth the AC waveform. The inverter 114 receives feedback from the output of the filter 116. That is, the output of the filter 116 is compared to a sinusoidal reference 118 by a comparator 120. The output of the comparator 120 is provided to a differentiator circuit 122 to determine the rate of change between the output of the filter 116 and the sinusoidal reference 118. The output of the differentiator circuit 122 is provided to the inverter 114. If the output of the filter 116 equals the sinusoidal reference 118, then the output of the differentiator circuit 122 is zero and no change is made to the inverter 114. However, if the output of the filter 116 does not equal the sinusoidal reference 118, then the output of the differentiator circuit 122 will be either a positive or a negative number and adjustments will be made by the inverter 114.

The rectifier 110 can be any circuit capable of converting the three phase output into a DC voltage, such as a three-phase bridge rectifier having six power diodes. It should be noted that in the past inverters have been used for converting the DC output of prior art alternators into a single phase AC signal of 120 Volts. The drawback of the prior art is that all of the power must pass through the prior art alternator's rectifier causing significant losses and inefficiencies. Because the three phase output from the transformer 80 has a much higher voltage, i.e. about ten times higher when the alternator system is a 12 Volt system, the losses caused by the rectifier 110 is ten times less than the losses caused by the prior art alternator's rectifier.

The DC-AC inverter 112 can be designed in many different ways known in the art. The DC-AC inverter 112 shown in FIG. 4B is a typical inverter having an "optimum-response" pulse-width modulation.

The electrical outlet 84 receives the AC output signal having the increased voltage and converted frequency. An electrical implement 130 can be connected to the electrical outlet 84 of the power converter 9 so as to provide power to the electrical implement 130. The electrical implement 130 can be any implement for converting electrical power into a form usable by an end user, provided that the electrical implement 130 does not require more electricity than the alternator 10 is capable of producing. For example, the electrical implement 130 can be a television, a light bulb, a microwave oven, a refrigerator, a coffee maker, a hair dryer, a laptop computer, a desktop computer having a monitor, a freezer, a curling iron, a space heater (e.g., 30,000 btu or 140,000 btu), a 1" hand drill, a ¼" hand drill, a 12 Volt battery charger, an electric chain saw, a belt sander, a circular saw, an edge trimmer, a hedge trimmer, an electric nail gun, a disc sander (9"), an impact wrench, a jet pump, an oil burner on a furnace, an airless—⅓ HP paint sprayer, a radio, a slow cooker, a sump pump or a weed trimmer. The power output of the alternator 10 will depend on the size of the alternator 10. The maximum output at the electrical outlet 84 can be between about 1000 to about 5000 watts.

Figure 3:
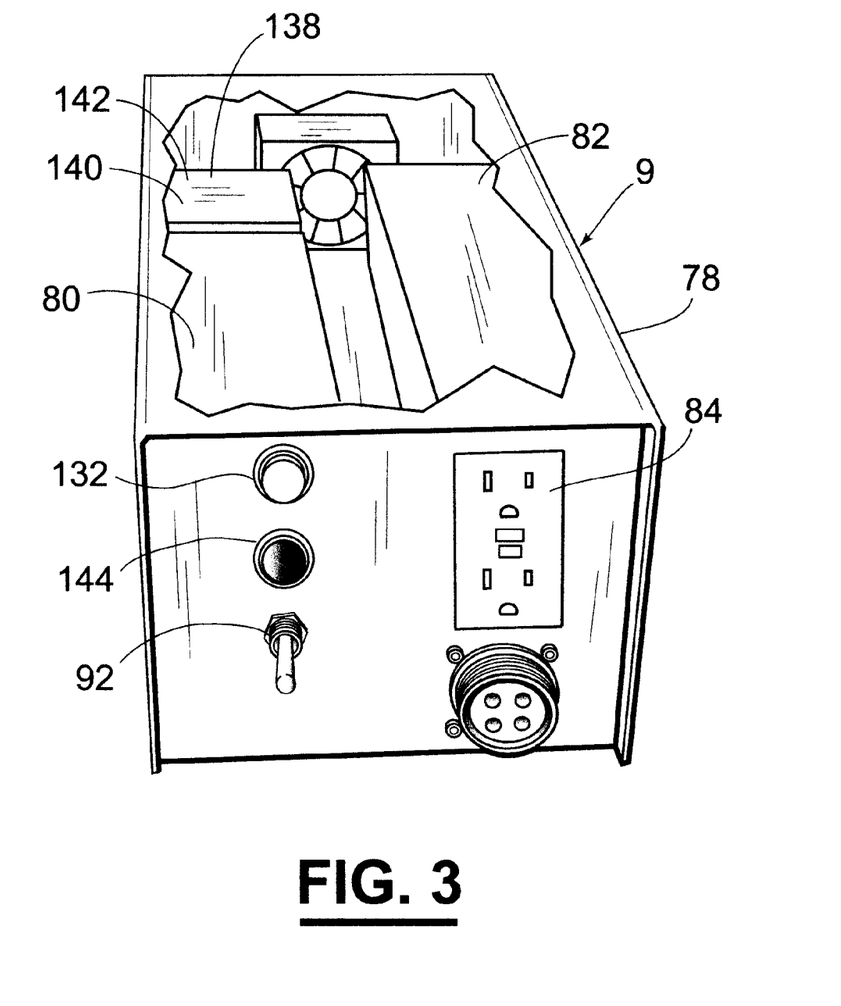
FIG. 3 is a perspective view of a power converter of the portable generator reassembly depicted in FIG. 1.

As shown in FIGS. 3 and 4, the power converter 9 can also be provided with a circuit breaker 132, an on/off switch 134, and a fuse 136. The circuit breaker 132, on-off switch 134, and the fuse 136 can be mounted to the housing 78 so that a user can manipulate and control the circuit breaker 132, the on-off switch 134, and the fuse 136. The circuit breaker 132 and the on-off switch 134 are desirably provided between the transformer 80 and the frequency changer 82. The fuse 136 is desirably provided between the frequency changer 82 and the electrical outlet 84. When the AC output signal is a three-phase signal, the circuit breaker 132 and the on-off switch 134 are preferably three-phase components. The fuse 136 can be any suitable fuse, such as a 30 amp fuse.

The power converter 9 can optionally include a voltage control system 138. The voltage control system 138 senses the voltage of the AC output signal, desirably at the electrical outlet 84, and cuts off the AC output signal to the electrical outlet 84 in the event that an over-voltage condition exists, or an under-voltage condition exists so as to protect the electrical implement 130 receiving power from the electrical outlet 84.

An over-voltage condition exists when the voltage sensed by the voltage control system 138 exceeds the desired voltage by about 10–15%. Likewise, an under-voltage condition exists when the voltage sensed by the voltage control system 138 is below the desired voltage by about 10–15%. For example, assuming that the desired voltage is 120 V, the acceptable range of deviation may be from about 100 Volts to about 140 Volts, and more desirably between about 105 Volts to about 130 Volts. In the example where the acceptable range of deviation was from about 100 Volts to about 140 Volts for a desired voltage of 120 Volts, the voltage control system 138 would cut off the AC output signal to the electrical outlet 84 in the event that the Voltage of the AC output signal was less than 100 Volts or greater than 140 Volts.

The power converter 9 is optionally provided with a temperature control 140. The temperature control 99 monitors the temperature of the controllable power switches 94, 96 and 98 of the power converter 9, and cuts off the AC output signal to the electrical outlet 84 in the event that the temperature of the controllable power switches 94, 96 and 98 exceeds a predetermined cutoff temperature. In general, the cutoff temperature is selected in an attempt to prevent any damage to the electrical components, such as the transformer 80 and the frequency changer 82, located within the housing 78. The cutoff temperature can vary widely depending on the particular electrical components utilized to implement the power converter 9. A suitable cutoff temperature has been found to be about 85° C.

The power converter 9 is also provided with a speed sensor 142. The speed sensor 142 receives the AC output signal produced by the alternator 10 and monitors the frequency of the AC output signal to determine the speed of rotation of the rotor 24 of the alternator 10. The speed sensor 142 outputs a control signal when the speed of the rotor 24 exceeds a predetermined rate of rotation, such as 5000 RPM. The control signal can be perceived by a computer associated with the throttle of the vehicle 11 so as to provide automatic adjustment to the throttle. Alternatively, when the speed of rotation of the rotor 24 is to be adjusted manually, the control signal can be perceivable by an individual so as to inform the individual that the speed of the rotor 24 is sufficient to provide the AC output signal with a required voltage level and current level. For example, the control signal can be in the form of light produced by a light bulb 144. The light bulb 144 can be mounted to the housing 78 of the power converter 9 so that the light produced by the light bulb 102 is perceivable by the individual. Alternatively, or in addition, the control signal can be provided in an auditory format, a vibratory format, an analog dial format, a digital dial format, or any other suitable format perceivable by the individual.

Figure 5:
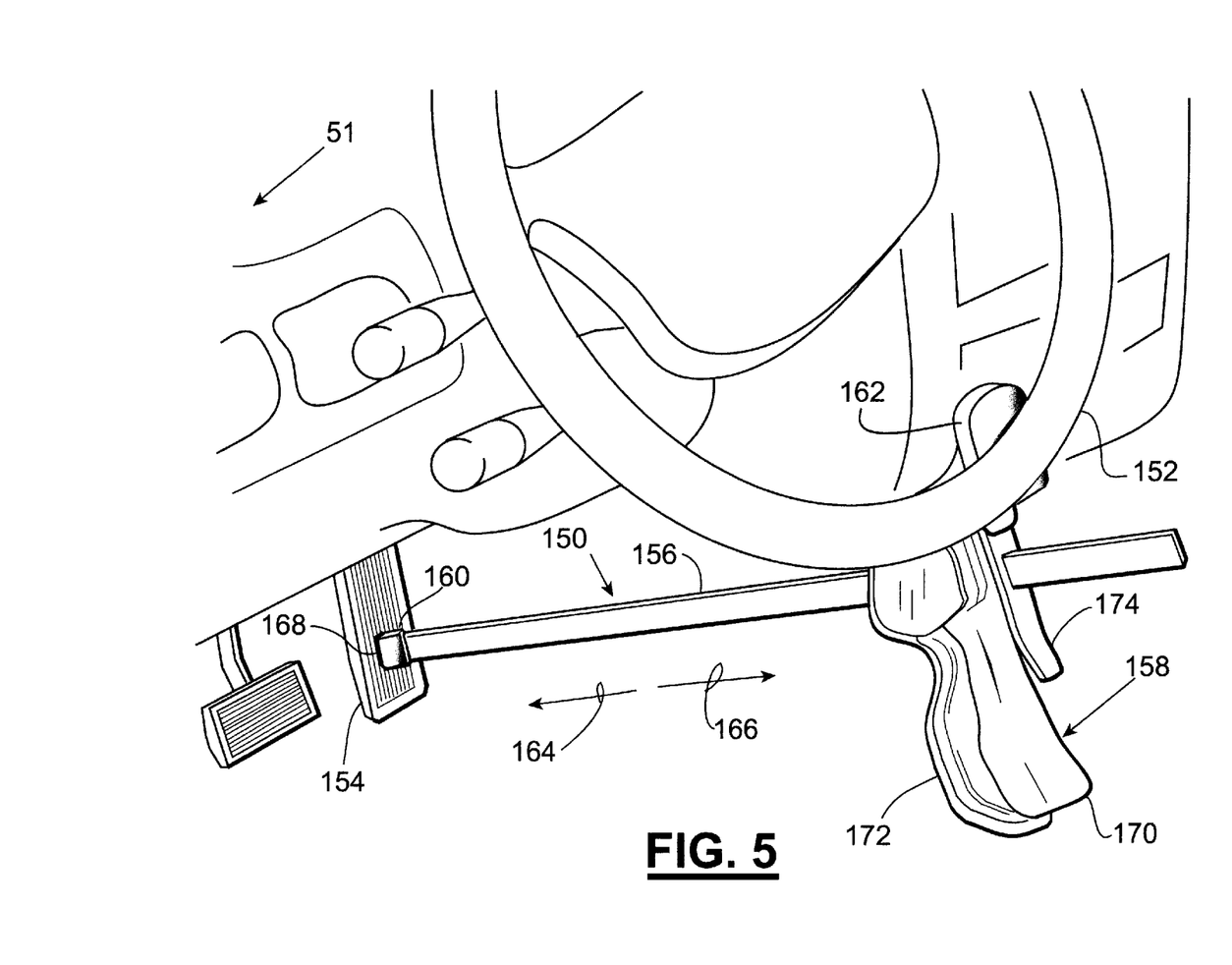
FIG. 5 is a perspective view of a speed control assembly for controlling the speed of the vehicle's engine.

Referring now to FIG. 5, shown therein is one preferred embodiment of a speed control assembly 150 for controlling the speed of the vehicle's engine 51, and thus, the rotational speed of the rotor 24 of the alternator 10 so that the speed of the rotor 24 is sufficient to provide the AC output signal with a required voltage level and current level to meet the requirements of the electrical implement.

In the preferred embodiment, the speed control assembly 105 is positioned between a steering wheel 152 and a gas pedal 154 of the vehicle 51. The steering wheel 152 serves to stabilize the speed control assembly 150 relative to the gas pedal 154 so that the gas pedal 110 can be moved and maintained at a selected position for controlling the speed of the vehicle's engine 51. Although the speed control assembly 150 is stabilized by the steering wheel 152, it should be understood that it is not necessary for the speed control assembly 150 to be stabilized by the steering wheel 152. That is, the speed control assembly 150 can be stabilized by any device which is stable relative to the gas pedal 154. For example, the speed control assembly 150 could be stabilized by the seat or a portion of the dash of the vehicle 11.

The speed control assembly 150 is provided with a rod 156, a clamping assembly 158, and a grip member 160. The clamping assembly 158 includes a clamping member 162 which is shaped so as to be positionable about at least a portion of the steering wheel 152. The grip member 160 is positioned on one end of the rod 156. The clamping assembly 158 is movable on the rod 156 in a first direction 164 toward the grip member 160 so as to decrease pressure on the gas pedal 154 thereby decreasing the speed of the engine 51, and in a second direction 166 away from the grip member 160 so as to increase pressure on the gas pedal 154 thereby increasing the speed of the engine 51.

The grip member 160 has a non-skid surface 168 for engaging the gas pedal 154. The term "non-skid surface" as used herein, refers to a surface that is adapted or configured such that when the non-skid surface 168 is applied to the gas pedal 154, the non-skid surface 168 engages the gas pedal 154 so as to prevent the grip member 160 from sliding on the gas pedal 154. For example, the non-skid surface 168 can be constructed of a friction engaging substance, such as neoprene. Alternatively, the nonskid surface 168 can be provided with an uneven surface, such as spikes or ridges, adapted to mechanically grip the gas pedal 154.

The clamping assembly 158 has a stationary member 170 and a movable member 172. The stationary member 170 and the movable member 172 are configured so that an individual's thumb can be wrapped about the stationary member 170 and the individual's fingers can be wrapped about the movable member 172. In this position, the individual squeezes his/her hand to move the movable member 172 relative to the stationary member 170 to move the clamping assembly 158 in the second direction 166 on the rod 112. The clamping assembly 158 is also provided with a release tab 174 for releasing the clamping force from the rod 156 and thereby permitting the clamping assembly 158 to be moved in the first direction 164.

Although one preferred embodiment of the speed control assembly 150 has been described herein by way of the rod 156, clamping assembly 158, grip member 160, and the clamping member 162, it should be understood that the speed control assembly 150 can be any device capable of controlling the speed of the engine 51. For example, the speed control assembly 150 can be programming provided in a computer associated with the throttle of the vehicle 11, a screw mechanism for predetermined positioning of the gas pedal 154 or throttle of the vehicle 11, a weighted member provided on the gas pedal 110 or any other device capable of maintaining the speed of the engine 51 at a desired rate.

To convert the vehicle 11 into the portable generator assembly 8 capable of outputting the AC output signal having a frequency of at least about 45 Hz, and a voltage of at least about 105 V, the alternator 10 is first installed into the vehicle 11. That is, the alternator 10 is bolted or clamped to the vehicle 11. Then, a belt 178 (FIG. 1) is positioned about a rotor pulley 142 connected to the rotor 24 of the alternator 10. Once the belt 178 is on the rotor pulley 180 (FIG. 1), the belt 178 is tightened in a well-known manner.

Once the alternator 10 is installed in the vehicle 11, the AC input port 85 of the power converter 9 is connected to the AC output port 70 of the alternator 10. The power converter 9 converts the AC signal generated by the alternator 10 to an AC output signal having a substantially stabilized frequency in a range from about 45 Hz to about 65 Hz and a substantially stabilized voltage in a range from about 105 V to about 130 V. The throttle of the vehicle 11 and thus, the speed of rotation of the rotor 24, is then adjusted via the speed control assembly 150 until the speed sensor 142 outputs a signal to the light bulb 102 when the speed. of rotation of the rotor 24 is at the desired rate. Preferably, the power converter 9 is positioned such that the light bulb 144 is visible from the driver's seat to make it easier for the individual to see when the light bulb 144 is lit. However, the light bulb 144 can be provided in the dark.

Once the speed of rotation is at the desired rate, the electrical implement 130 can then be plugged into or otherwise connected to the electrical outlet 84 so as to provide power to the electrical implement 130.

It should be understood that the alternator 10 of the present invention can be an OEM alternator, an aftermarket alternator or a remanufactured alternator. The alternator 10 can be a replacement for the existing alternator in the individual's vehicle 11.

The alternator 10, the power converter 9 and the speed control assembly 150 can be sold together as a kit for converting the vehicle 11 into the portable generator assembly 8. In this instance, the alternator 10 would most likely be a replacement alternator for the existing alternator in the individual's vehicle 11. The power converter 9 would preferably in this instance be a portable unit so that the power converter 9 could be stored in the trunk of the vehicle 11 and removed from the trunk for usage, for example. Alternatively, the alternator 10, the power converter 9 and the speed control assembly 150 can be sold separately.

In addition, the alternator 10, the power converter 9 and the speed control assembly 150 can be installed in a new vehicle 11 by a manufacturer, such as General Motors, Inc. or the Ford Motor Company. In this instance, the power converter 9 may or may not be portable relative to the vehicle 11. For example, the power converter 9 could be permanently installed in the vehicle 11, or provided as a portable accessory stored in the trunk of the vehicle 11, for example.

The alternator 10 can be constructed by modifying a prior art alternator, such as a Big 3G obtainable from Ford Motor Company, or a CS144 obtainable from General Motors. That is, the alternator 10 can be constructed from any alternator having a stator capable of producing at least about 1000 Watts of power and constructed to mechanically mount to a vehicle, such as the vehicle 11. For example, the alternator 10 can be constructed by modifying a prior art alternator or a newly developed alternator, by electrically connecting the AC output port 70 to the stator windings (or input of the rectifier) of the alternator for receiving the AC output signal induced in the stator windings, and thereby providing access to the AC output signal such that the AC output signal can provide AC power at a location outside of the housing of the alternator.

From the above description it is clear that the present invention is well adapted to carry out the objects and to attain the advantages mentioned herein as well as those inherent in the invention. While a presently preferred embodiment of the invention has been described for purposes of this disclosure, it will be understood that numerous changes may be made which will readily suggest themselves to those skilled in the art. Thus, changes may be made in the embodiments of the invention described herein, or in the parts or the elements of the embodiments described herein, or in the steps or sequence of steps of the methods described herein, without departing from the spirit and/or the scope of the invention as defined in the following claims.

What is claimed is:

1. A portable generator assembly, comprising:
    an alternator installable in a vehicle, the alternator comprising:
        a housing defining an alternator interior space;
        a rotor coil disposed in the alternator interior space and rotatably supported by the housing, the rotor coil generating a magnetic field;
        a plurality of stator windings supported by the housing and positioned in the magnetic field for generating an AC output signal;
        a voltage regulator being electrically connected to the rotor coil for controlling the intensity of the magnetic field;
        a rectifier having an input and an output, the input of the rectifier being electrically connected to the stator windings such that the input of the rectifier receives the AC output signal generated by the stator windings, the rectifier converting the AC output signal to a DC output signal; and
        an AC output port electrically connected to the stator windings for receiving the AC output signal, and providing access to the AC output signal such that the AC output signal can provide AC power at a location outside of the housing; and
    a power converter positioned outside of the housing of the alternator, the power converter comprising:
        a transformer receiving the AC output signal from the AC output port and increasing the voltage of the AC output signal to at least about 120 V;
        a frequency changer receiving the AC output signal having the increased voltage, and converting the frequency of the AC output signal to a frequency between about 45 to about 65 Hz; and
        an electrical outlet receiving the AC output signal having the increased voltage and converted frequency.

2. The portable generator assembly of claim 1 wherein the AC output port includes a plurality of leads connecting a plug to the stator windings.

3. The portable generator assembly of claim 1 wherein the AC output port includes a plurality of leads extending from the housing of the alternator.

4. The portable generator assembly of claim 1, further comprising a circuit breaker positioned between the transformer and the frequency changer.

5. The portable generator assembly of claim 1, further comprising a voltage control system cutting off the AC output signal to the electrical outlet, responsive to the AC output signal being less than about 105 Volts.

6. The portable generator assembly of claim 1, further comprising a voltage control system cutting off the AC output signal to the electrical outlet, responsive to the AC output signal being greater than about 130 Volts.

7. The portable generator assembly of claim 6, wherein the voltage control system cuts off the AC output signal to the electrical outlet, responsive to the AC output signal being less than about 105 Volts.

8. The portable generator assembly of claim 1, further comprising a speed sensor for monitoring the speed of rotation of a rotor of the alternator, the speed sensor outputting a control signal when the speed of the rotor exceeds a predetermined rate of rotation, the control signal being perceivable by an individual so as to inform the individual that the speed of the rotor is sufficient to provide the AC output signal with a required voltage level and current level.

9. A method for converting a vehicle into a portable generator assembly capable of outputting an AC output signal having a frequency of at least about 45 Hz, and a voltage of at least about 105 V, the method comprising the steps of:

installing an alternator into the vehicle, the alternator having an AC output port and a DC output port with the AC output port providing access to an AC signal generated by the alternator, the AC signal having a varying frequency; and connecting a power converter to the AC output port of the alternator, the power converter converting the AC signal generated by the alternator to an AC output signal having a substantially stabilized frequency in a range from about 45 Hz to about 65 Hz and a substantially stabilized voltage in a range from about 105 V to about 130 V, the power converter having an electrical outlet receiving the AC output signal having the substantially stabilized frequency and substantially stabilized voltage.

10. The method of claim 9, further comprising the step of adjusting the throttle of the vehicle so as to maintain the speed of the rotor at a sufficient rate to provide the AC output signal with a required voltage level and current level.

11. The method of claim 10, wherein the sufficient rate is at least about 4000 RPM.

* * * * *

UNITED STATES PATENT AND TRADEMARK OFFICE
CERTIFICATE OF CORRECTION

| | | |
|---|---|---|
| PATENT NO. | : 6,476,509 B1 | Page 1 of 2 |
| APPLICATION NO. | : 09/838648 | |
| DATED | : November 5, 2002 | |
| INVENTOR(S) | : John Jianing Chen et al. | |

It is certified that error appears in the above-identified patent and that said Letters Patent is hereby corrected as shown below:

Column 1, line 33: After the word "to" and before the word "run", delete the "period".

Column 2, line 2: After the word "engine" and before the word "reduces", delete the "semi-colon" and replace with a --comma--.

Column 2, line 20: After "AC" and before the word "generator", delete the "comma".

Column 2, line 26: After the word "the" and before the word "engine", delete the "comma".

Column 3, line 52: After the word "generator" delete the word "reassembly" and replace with the word --assembly--.

Column 4, line 7: After the word "constant" and before the word "frequency", delete the "period".

Column 5, line 7: After "(FIG. 1)" and before the word "of", delete the "period".

UNITED STATES PATENT AND TRADEMARK OFFICE
CERTIFICATE OF CORRECTION

PATENT NO. : 6,476,509 B1
APPLICATION NO. : 09/838648
DATED : November 5, 2002
INVENTOR(S) : John Jianing Chen et al.

It is certified that error appears in the above-identified patent and that said Letters Patent is hereby corrected as shown below:

Column 5, line 22: After the word "electricity", delete the "semi-colon" and replace with a --comma--.

Column 7, line 9: After the word "synthesizer." and before the word "frequency", delete "T he" and replace with --The--.

Column 7, line 67: After the word "should" and before the word "be", delete the "period".

Column 11, line 1: After the word "speed" and before the word "of", delete the "period".

Signed and Sealed this

Twenty-first Day of November, 2006

JON W. DUDAS
*Director of the United States Patent and Trademark Office*